United States Patent [19]
Theysohn et al.

[11] 4,137,212
[45] Jan. 30, 1979

[54] FLAMEPROOFED NYLON MOLDING COMPOSITIONS

[75] Inventors: Rainer Theysohn, Ludwigshafen; Klaus Penzien; Wolfgang Seydl, both of Frankenthal; Rolf Wurmb, Heidelberg; Horst Reimann, Worms; Claus Cordes, Weisenheim; Hans-Josef Sterzel, Dannstadt-Schauernheim, all of Fed. Rep. of Germany

[73] Assignee: BASF Aktiengesellschaft, Ludwigshafen, Fed. Rep. of Germany

[21] Appl. No.: 855,890

[22] Filed: Nov. 30, 1977

[30] Foreign Application Priority Data

Jan. 28, 1977 [DE] Fed. Rep. of Germany ....... 2703419

[51] Int. Cl.$^2$ ............................ C08K 5/03; C08K 3/10
[52] U.S. Cl. .......................... 260/37 N; 260/45.7 RT; 260/45.75 B; 260/857 D; 260/45.75 W; 260/857 G; 260/45.75 V; 260/857 L; 260/45.75 P

[58] Field of Search ........ 260/45.7 RL, 37 N, 857 D, 260/857 G, 857 L, 45.75 P, 45.75 W, 45.75 V, 45.75 B

[56] References Cited

U.S. PATENT DOCUMENTS

| | | | |
|---|---|---|---|
| 3,287,288 | 11/1966 | Reiling | 260/857 L |
| 3,347,822 | 10/1967 | Jenkner | 260/45.75 B |
| 3,418,267 | 12/1968 | Busse | 260/33.8 R |
| 3,474,067 | 10/1969 | Praetzel et al. | 260/45.75 B |
| 3,630,988 | 12/1971 | Deyrup | 260/45.7 RL |
| 3,810,861 | 5/1974 | Tacke et al. | 260/45.75 P |
| 3,842,029 | 10/1974 | Saito et al. | 260/857 D |
| 3,898,194 | 5/1975 | Sanroma | 260/45.75 RL |
| 3,965,197 | 6/1976 | Stepniczka | 260/623 H |
| 3,988,284 | 10/1976 | Wurmb | 260/857 UN |

Primary Examiner—V. P. Hoke
Attorney, Agent, or Firm—Keil, Thompson & Shurtleff

[57] ABSTRACT

A flameproofed nylon molding composition which can be processed by thermoplastic methods and which contains, as the flameproofing agent, from 5 to 30% by weight of brominated styrene oligomers and a synergistic metal oxide. The compositions may be used for the manufacture of injection moldings for the electrical industry.

12 Claims, No Drawings

FLAMEPROOFED NYLON MOLDING COMPOSITIONS

Thermoplastics based on nylons burn on contact with a naked flame, frequently with severe decomposition. In addition, the moldings may drip burning particles of a melt of low viscosity, causing further spread of the fire. There is a continuously increasing number of applications for which it is necessary that nylons which can be processed by thermoplastic methods should resist the spread of fire and should, when no longer exposed to a flame, not continue to burn but self-extinguish. Accordingly, there is a need to provide self-extinguishing nylon molding compositions which do not drip on exposure to a flame. Fiber-reinforced plastics exhibit somewhat different burning characteristics. They continue to burn after removal of the igniting flame, presumably due to a wicking action of the fibers. It is therefore also desirable that such materials should be flameproofed.

It has been disclosed that flammable plastics can be flameproofed by incorporation of halogen compounds, with or without certain metal compounds. Thermoplastic nylons, above all those having a high melting point, for example nylon 6,6, are conventionally processed at up to 300° C. In the case of filler-reinforced nylons, in particular, relatively high processing temperatures must be used. However, most of the conventional halogen-based flameproofing agents decompose at these temperatures, and this may lead to the production of corrosive gases and to discoloration of the moldings. It is a further disadvantage that many halogen compounds, eg. chlorinated or brominated aliphatic, cycloaliphatic or aromatic low-molecular weight compounds, are very toxic. Because of the poor compatibility of most low-molecular weight halogen compounds with nylons, and because of the relatively high vapor pressure of such halogen compounds, the flameproofing agent may exude and form a surface film. Furthermore, in many cases the flow of glass fiber-reinforced nylons provided with conventional flameproofing agents is too low for injection molding, so that, for example, it has hitherto not been possible satisfactorily to flameproof nylon 6,6, injection moldings of complicated shape.

German Published Application DAS No. 1,570,395 and German Laid-Open Application DOS No. 2,459,062 disclose the use of high-molecular weight nuclear-brominated polystyrenes, especially polytribromostyrenes, as flameproofing agents for polyolefins, epoxy resins, styrene polymers and polyester molding compositions. German Laid-Open Application DOS No. 2,213,801 discloses polymeric halogen-containing flameproofing agents for nylons, an example of such agents being brominated polycarbonates. It is true that these flameproofing agents do not suffer from most of the above disadvantages, but they can only be manufactured by troublesome and expensive processes. Furthermore, the thermoplastic processability of the molding compositions is adversely affected by the poor compatibility of the nylon with the high-molecular weight additives.

It is an object of the present invention to provide a relatively simple flameproofing agent for nylons, which has a low vapor pressure, is very heat-stable, has a low toxicity, possesses good compatibility with nylons and does not substantially reduce the flow and processability of the molding compositions.

We have found that this object is achieved by using brominated styrene oligomers.

Accordingly, the present invention provides nylon molding compositions which can be processed by thermoplastic methods and which contain from 5 to 30% by weight of brominated styrene oligomers together with a synergistic metal oxide and with or without fillers.

The nylons to be rendered flameproof, in accordance with the invention, are preferably saturated linear nylon homopolymers, eg. polycaprolactam (nylon 6), polyhexamethylene adipamide (nylon 6,6), polyhexamethylene sebacamide, polylauryllactam and polyundecanamide, as well as nylon homopolymers and copolymers which are manufactured using, on the one hand, adipic acid, azelaic acid, sebacic acid, dodecanedicarboxylic acid or terephthalic acid and, on the other hand, hexamethylenediamine, trimethylhexamethylenediamine, bis-(4-aminocyclohexyl)-methane or 2,2-bis-(4'-aminocyclohexyl)-propane, as well as nylon copolymers which are obtained by polycondensation of lactams together with the above dicarboxylic acids and diamines.

The brominated styrene oligomers employed as flameproofing agents advantageously have a mean (number-average) degree of polymerization of from 3 to 90, preferably from 5 to 60, measured by vapor pressure osmometry in toluene. Cyclic oligomers may also be used. According to a preferred embodiment of the invention, the brominated styrene oligomers to be employed have the formula shown below, where R is hydrogen or an aliphatic radical, especially alkyl, eg. $CH_3$ or $C_2H_5$, and n is the number of recurring structural units of the chain. R' may be H or bromine or a fragment of a conventional compound which forms free radicals.

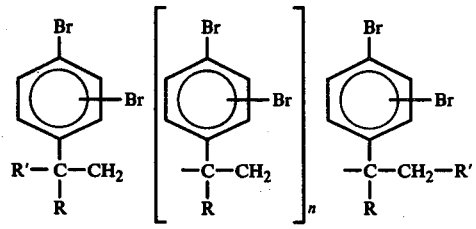

n may be from 1 to 88, preferably from 3 to 58. The brominated oligostyrenes on average contain from 40 to 80% by weight of bromine. A product consisting predominantly of polydibromostyrene is preferred. The substances are fusible without decomposition and are soluble in, for example, tetrahydrofuran. They can be manufactured either by nuclear bromination of styrene oligomers as obtained, for example, by thermal polymerization of styrene in accordance with the method of German Laid-Open Application DOS No. 2,537,385 (which oligomers may or may not have been converted to aliphatic compounds by hydrogenation), or by free radical oligomerization of suitable brominated styrenes. The flameproofing agents can also be manufactured by ionic oligomerization of styrene, followed by bromination. The amount of brominated oligostyrene required for rendering the nylons flameproof depends on the bromine content of the oligostyrene. The bromine content in the molding compositions according to the invention will usually be from 4 to 20% by weight, preferably from 5 to 12% by weight. The nylon molding compositions contain from 5 to 30, preferably from 8 to 25, and especially from 10 to 20%, by weight of brominated styrene oligomers.

Suitable synergistic metal oxides for the brominated styrene oligomers are the conventional synergistic metal oxides. Antimony trioxide is particularly preferred, but zinc oxide, lead oxide and iron oxide may also be used, as may mixtures of metal oxides. Metal oxides which have been precipitated, in amounts of from 20 to 80% by weight, on suitable inorganic carriers, eg. on finely divided kaolin, calcined kaolin, talc or chalk, are particularly effective. The amount of metal oxide in the molding composition is preferably from 2 to 15%, especially from 3 to 10% by weight.

The molding compositions may contain inorganic reinforcing fillers, preferably silicates and carbonates. Suitable fillers include, in particular, glass fibers, preferably with diameters of from 6 to 20 μm, carbon fibers, potassium titanate fibers, glass beads, metal whiskers, talc, wollastonite, mica, quartz, kaolin, calcined kaolin and chalk. The amount of these additives may be up to 60% by weight, based on the molding composition, but is preferably from 10 to 40% by weight. The additives are advantageously treated with silane-based adhesion promoters and/or with additional sizing agents.

Where fibrous reinforcing agents, especially glass fibers, are added, it is advantageous additionally to use a skeleton-forming non-fibrous filler, eg. kaolin, talc, chalk, quartz, mica or bentonite, preferably in amounts of from 2 to 20% by weight based on the molding compositions. These additives improve the flameproofing action and prevent dripping of burning particles in the event of a fire. If the synergistic metal oxide employed has been precipitated on an appropriate carrier, the latter at the same time acts as a skeleton-forming agent.

In the case of molding compositions which do not contain an inorganic reinforcing agent, it is advantageous to add polymeric organic fillers, preferably in amounts of from 1 to 30% by weight, to prevent dripping of burning particles. An example of such a filler is polytetrafluoroethylene, preferably with a mean particle size of from about 1 to 20 μm. It is advantageous to employ it in amounts of from 2 to 5% by weight, based on the molding composition. Graft copolymers of one or more vinyl monomers, eg. styrene, acrylonitrile or methyl methacrylate, and a rubbery polymer, eg. a homopolymer or copolymer of butadiene and of acrylic esters, which may or may not be modified by comonomers which form crosslinks, can also be used, preferably in amounts of from 5 to 20% by weight. Mixtures of such graft copolymers with nylons are disclosed in German Laid-Open Application DOS No. 2,435,266.

In addition to the above fillers, the nylon molding compositions may also contain other additives, eg. heat stabilizers, thermo-oxidative stabilizers and UV stabilizers, dyes, pigments and processing assistants, eg. waxes, lubricants and mold release agents, which ensure trouble-free extrusion and injection molding.

The thermoplastic molding compositions are preferably manufactured by mixing granular nylon with the additives according to the invention, then melting the mixture, incorporating the fillers and homogenizing the batch in a suitable extruder, extrusion, cooling and granulation, with or without drying. The molding compositions are above all useful for the manufacture of injection moldings, for example for the electrical industry.

In the Examples, parts and percentages are by weight. The brominated oligostyrene (BOS) used had a mean degree of polymerization of about 15, a bromine content of 63% and a vapor pressure of 6 mm Hg at 230° C.

EXAMPLE 1

Granular nylon 6,6 (relative viscosity 2.65, measured in 1% strength solution in concentrated sulfuric acid) was fused on a twin-screw extruder at 280° C., the additives according to the invention were introduced and the mixture was homogenized, extruded through a die, drawn off as a strand, cooled and granulated. Test specimens of size 127 × 12.7 × 1.6 mm were injection-molded from the granules on a screw injection molding machine at a material temperature of 280, 300 and 305° C. and in each case the minimum injection pressure which just sufficed to fill the mold was determined. The burning characteristics were determined by a method based on instruction UL 94 of Underwriters Laboratories, whilst the color of the injection moldings was assessed visually. The values are summarized in the Table.

TABLE 1

| Experiments | | Composition | Material temperature on injection molding (° C) | Minimum injection pressure (bar) | Discoloration | Burning characteristics according to UL 94 |
|---|---|---|---|---|---|---|
| a | 13.2 | parts of BOS | 280 | 420 | — | V 0 |
|   | 12 | parts of antimony trioxide precipitated on talc (1:1) | 300 | 230 | — | V 0 |
|   | 25 | parts of glass fibers | 305 | 190 | slight | V 0 |
|   | 49.8 | parts of nylon 6,6 | | | | |
| b | 10 | parts of decabromodiphenyl ether (83% of Br) | 280 | 530 | slight | V 0 |
|   | 12 | parts of antimony trioxide precipitated on talc (1:1) | 300 | 320 | strong | V 0 |
|   | 25 | parts of glass fibers | 305 | 290 | very strong | V 2 |
|   | 53 | parts of nylon 6,6 | | | | |
| c | 14.5 | parts of BOS | 280 | 250 | — | V 0 |
|   | 6 | parts of antimony trioxide | 300 | 190 | — | V 0 |
|   | 30 | parts of talc | 305 | 175 | — | V 0 |
|   | 49.5 | parts of nylon 6,6 | | | | |

Experiment b is not in accordance with the invention.

EXAMPLE 2

Nylon 6,6 of relative viscosity 2.65 (measured at 1% strength in sulfuric acid) was mixed, in a fluid mixer, with the additives shown in Table 2 and the mixture was compounded on a twin-screw extruder at 280° C. The product was dried and injection-molded at a material temperature of up to 305° C., to give moldings of size 127 × 12.7 × 3.1 mm. The burning characteristics were determined as described in Example 1.

The test specimens showed no discolorations which might have indicated decomposition of the flameproofing agent.

The graft rubber used is a graft copolymer in which 40 parts of a 75:25 mixture of styrene and acrylonitrile were polymerized in the presence of 60 parts of a prepolymer of 98% of n-butyl acrylate and 2% of tricyclodecenyl acrylate.

The results are shown in Table 2.

TABLE 2

| Experiment | Burning characteristics according to UL 94 |
| --- | --- |
| a. nylon 6,6 (PA 66) | V 2[+)] |
| b. 88% of PA 66 | |
| 12% of acrylate graft rubber | V — |
| c. 75% of PA 66 | |
| 8% of BOS | V 1 |
| 7% of $Sb_2O_3$ | |
| 10% of acrylate graft rubber | |
| d. 82% of PA 66 | |
| 13% of BOS | V 1 |
| 2.5% of $Sb_2O_3$ | |
| 2.5% of ZnO | |
| e. 66% of PA 66 | |
| 14% of BOS | V 0 |
| 8% of $Sb_2O_3$ | |
| 12% of acrylate graft rubber | |
| f. 75% of PA 66 | |
| 14% of BOS | V 1 |
| 8% of $Sb_2O_3$ | |
| 3% of polytetrafluoroethylene | |

[+)]self-extinguishes, whilst dripping molten burning particles.

We claim:

1. A synthetic linear polyamide molding composition which can be processed by thermoplastic methods and which contains a halogen-containing flameproofing agent and a synergistic metal oxide, with or without a filler, wherein the flameproofing agent comprises from 5 to 30% by weight, based on the total molding composition, of brominated styrene oligomers, said oligomers containing from 40 to 80% by weight of bromine, having a mean degree of polymerization of from 3 to 90, and having been manufactured by nuclear bromination of styrene oligomers.

2. A synthetic linear polyamide molding composition as set forth in claim 1, which contains from 2 to 15% by weight of the synergistic metal oxide.

3. A synthetic linear polyamide molding composition as set forth in claim 1, wherein the metal oxide is antimony oxide, lead oxide, zinc oxide or iron oxide, which may or may not be precipitated on an inorganic carrier.

4. A synthetic linear polyamide molding composition as set forth in claim 1, which contains from 5 to 30 percent by weight of brominated styrene oligomers, from 2 to 15 percent by weight of the synergistic metal oxide and from 1 to 30 percent by weight of a polymeric organic filler which prevents dripping of burning particles in the event of a fire.

5. A synthetic linear polyamide molding composition as set forth in claim 4, wherein the polmeric organic filler is polytetrafluoroethylene or a graft copolymer of one or more vinyl monomers and a rubbery polymer.

6. A synthetic linear polyamide molding composition as set forth in claim 1, which contains from 5 to 30 percent by weight of brominated styrene oligomers, from 2 to 15 percent by weight of the synergistic metal oxide and from 5 to 60 percent by weight of an inorganic filler.

7. A synthetic linear polyamide molding composition as set forth in claim 6, wherein the inorganic filler is a silicate or a carbonate.

8. A synthetic linear polyamide molding composition as set forth in claim 6, wherein the inorganic filler consists of glass fibers.

9. A synthetic linear polyamide molding composition as set forth in claim 6, which contains as the inorganic filler from 10 to 40 percent by weight of glass fibers and from 2 to 20 percent by weight of a skeleton-forming non-fibrous inorganic filler.

10. A synthetic linear polyamide molding composition as set forth in claim 9, wherein the skeleton-forming filler is kaolin, talc, chalk, quartz, mica or bentonite.

11. A synthetic linear polyamide as set forth in claim 1, wherein nylon 6 to nylon 6,6 is used as the synthetic linear polyamide.

12. A synthetic linear polyamide molding composition as set forth in claim 1, wherein the brominated styrene oligomers consist predominantly of polymerized dibromostyrene, the bromine being introduced before or after polymerization.

* * * * *